United States Patent
Hayakawa et al.

(10) Patent No.: US 7,147,804 B2
(45) Date of Patent: Dec. 12, 2006

(54) TERMINAL ELECTRODE COMPOSITIONS FOR MULTILAYER CERAMIC CAPACITORS

(75) Inventors: Keiichiro Hayakawa, Tochigi (JP); Takuya Konno, Tochigi (JP); Hisashi Matsuno, Tochigi (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 378 days.

(21) Appl. No.: 10/671,309

(22) Filed: Sep. 25, 2003

(65) Prior Publication Data

US 2004/0144962 A1    Jul. 29, 2004

Related U.S. Application Data

(60) Provisional application No. 60/442,297, filed on Jan. 24, 2003.

(51) Int. Cl.
*H01B 1/22* (2006.01)
*B05D 5/12* (2006.01)

(52) U.S. Cl. .......................... 252/512; 252/513; 427/96

(58) Field of Classification Search ................ 252/512, 252/513; 338/22 R; 427/96
See application file for complete search history.

(56) References Cited

U.S. PATENT DOCUMENTS

| 3,516,949 | A |   | 6/1970  | Hoffman |
| 3,922,387 | A |   | 11/1975 | Larry |
| 4,451,869 | A |   | 5/1984  | Sakabe et al. |
| 4,880,567 | A |   | 11/1989 | Prabhu et al. |
| 5,645,765 | A |   | 7/1997  | Asada et al. |
| 5,688,441 | A |   | 11/1997 | Itagaki et al. |
| 5,781,402 | A |   | 7/1998  | Fujiyama et al. |
| 6,841,495 | B1 | * | 1/2005  | Tanaka et al. ............ 501/79 |

FOREIGN PATENT DOCUMENTS

| EP | 0 132 810 A1 | 2/1985 |
| EP | 1 122 220 A1 | 8/2001 |
| JP | 2001307549 A | 11/2001 |

* cited by examiner

*Primary Examiner*—Mark Kopec

(57) ABSTRACT

The present invention relates to terminal electrode compositions for multilayer ceramic capacitors. More specifically, it relates to terminal electrode compositions for multilayer ceramic capacitors, which compositions are made of a conductive-based powder and a glass frit and can be fired at a low temperature in a nitrogen atmosphere.

6 Claims, No Drawings

TERMINAL ELECTRODE COMPOSITIONS FOR MULTILAYER CERAMIC CAPACITORS

FIELD OF THE INVENTION

The present invention relates to terminal electrode compositions for multilayer ceramic capacitors. More specifically, it relates to terminal electrode compositions for multilayer ceramic capacitors. The compositions comprise conductive powder and a glass-frit binder and can be fired at a low temperature in a nitrogen atmosphere.

BACKGROUND OF THE INVENTION

Electrically conductive thick film paste compositions composed of a base metal such as copper or nickel, an inorganic binder, dispersed in an organic binder are widely used as terminal electrode materials for multilayer ceramic capacitors. The conductive pastes are fired in a neutral or reducing atmosphere to suppress oxidation of the constituent metals and the internal electrodes, and thus achieve a suitable terminal junction state. The inorganic binder used is mainly glass frit. The flowability (softening behavior) of the glass frit is one of the main factors affecting the sintering behavior of the conductive paste. The conventional base metal conductive pastes for terminal electrodes on multilayer ceramic capacitors contain a glass frit containing lead oxide and zinc oxide as the inorganic binder because for good flowability. Most such pastes have a firing temperature of at least 800° C. so as to provide the required properties after firing. Recent attention has been to conductive paste compositions for forming terminal electrodes of mutilayer ceramic capacitors of which layers are increased and are firable at a lower temperature which results in avoidance of adverse effect on the capacitor. There is also a strong market demand for lead, bismuth and cadmium-free terminal electrode forming material with other requisite properties from use in terminal electrode of multilayer ceramic capacitor.

However, problems associated with conventional conductive compositions containing such lead silicate glass being commonly used in this field when after drying to remove organic binder, fired at a temperature of less than 800° C. and for times sufficient to sinter the inorganic materials and to produce conductor patterns adherent to a terminal electrode-forming site of multilayer ceramic capacitor.

The glass flowability in the electrode is insufficient, compromising adhesion to the capacitor assembly, and even if adhesion to the capacitor assembly is good, sintering of the terminal electrode is inadequate and a dense structure is not formed. As a result, in the subsequent plating step, the plating solution passes through the terminal electrode, causing erosion of the glass components by acid in the solution, resulting in a serious loss in terminal strength.

Selecting a glass frit having a good flowability or low softening point for proceeding with sintering of the electrode at less than 800° C. so as to increase a density of formed electrode causes the glass to begin flowing before the bonding associated with alloying of the conductor in the internal electrode and the conductor in the terminal electrodes resulting into forming a thin dielectric layer between the internal electrode and the terminal electrode, reducing the stability and reliability of the electrical characteristics. Moreover, compositions containing a glass inorganic binder having a lower glass softening point, which also raises the coefficient of thermal expansion, causing cracks in the capacitor assembly or the electrodes because of differences in coefficient of thermal expansion between the electrode and the capacitor assembly, leading to a loss of electrical characteristics, adhesion and reliability.

The industry needs a lead, cadmium and bismuth-free terminal electrode composition containing glasses having a suitable softening point and a coefficient of thermal expansion for firing at a relatively low temperature and with good acid resistance.

In view of the above, it is an object of the invention to provide paste compositions for terminal electrodes, which paste compositions contain a glass frit that is free of lead, cadmium and bismuth and can provide necessary and sufficient post-firing characteristics when fired at a temperature of lower than 800° C., and preferably lower than 750° C.; that is, a glass frit having a softening point and a coefficient of thermal expansion within acceptable ranges and good acid resistance.

This invention enables the design and supply of base metal conductive pastes for terminal electrodes in multilayer ceramic capacitors, which pastes are free of lead, cadmium and bismuth and can be fired at temperatures below 800° C.

DETAILED DESCRIPTION OF THE INVENTION

The invention is directed to a conductor composition used for terminal electrodes that are capable of being fireable at a temperature of lower than 800° C. The glass found in the composition is free of lead, cadmium and bismuth, and it is preferably a borosilicate alkaline earth glass frit. The invention is described more fully below.

The glass frit used in the present invention has a softening point, as determined by differential thermal analysis, of 530 to 650° C.; a coefficient of thermal expansion (abbreviated hereinafter as "TCE"), as measured by thermomechanical analysis, of 9.0 to 11.5 ppm/° C.; and a loss of weight of less than 10% by 30 minutes of immersion in 0.1 N sulfuric acid at 50° C. If the softening point is more than 650° C., terminal electrodes having a dense structure cannot be achieved at a firing temperature of less than 800° C. On the other hand, if the softening point is less than 530° C., the glass begins to flow before the bonding associated with alloying of the internal electrode conductor and the terminal electrode conductor has a chance to happen. This leads to the formation of a thin dielectric layer between the internal electrode and the terminal electrode, which compromises the stability and reliability of the electrical characteristics. A softening point within a range of 550 to 620° C. is especially preferred. At a TCE outside of the above mentioned preferable range thereof, there is a high probability of cracking, resulting in a loss of reliability or adhesion. A TCE within a range of 9.0 to 11.5 ppm/° C. is preferred, with a range of 9.5 to 11.0 ppm/° C. more preferred.

The conditions of immersion in 0.1 N sulfuric acid described above in connection with measurement of the acid-induced loss in weight of the glass frit are believed to be more severe than the conditions actually encountered in the plating process. At a higher loss of weight than that indicated above, the glass becomes too easily eroded by the plating process, thus diminishing the adhesive strength after plating. A loss of weight less than 1% is especially preferred.

The glass frit used in the present invention does not contain lead, cadmium or bismuth. A glass has the following compositions: strontium oxide (SrO), barium oxide (BaO), a total content of SrO and BaO being 30 to 60%; boron oxide ($B_2O_3$), zinc oxide (ZnO) and sodium oxide ($Na_2O$), a total content of these three constituents being 20 to 45% wherein the sodium oxide ($Na_2O$) is 0 to 7%, based on a total weight of the oxides forming the glass.

In a firing temperature range of up to 800° C., glass frits having a SrO+BaO content of less than 30% have a very poor acid resistance, and glass frits having a SrO+BaO content of more than 60% lack sufficient glass flowability. The SrO+BaO content is preferably 40 to 55%. At a $B_2O_3$+ZnO+optional $Na_2O$ content of less than 20%, a sufficient glass flowability is not achieved, whereas such content of $B_2O_3$+ZnO+optional $Na_2O$ greater than 45% compromises the acid resistance. The $B_2O_3$+ZnO+optional $Na_2O$ content is preferably 25 to 40%.

At a sodium oxide ($Na_2O$) content of more than 7%, there is a greater likelihood of the coefficient of thermal expansion exceeding the upper limit in the above mentioned preferable range thereof, in addition glass flowability becomes excessive and sintering proceeds too rapidly. This can lead to shape defects in the terminal electrode due to blistering, and can also lead to glass flow before the bonding associated with alloying of the internal electrode conductor and the terminal electrode conductor has a chance to arise, resulting in the formation of a thin insulating layer between the internal electrode and the terminal electrode which compromises the stability and reliability of the electrical characteristics. A sodium oxide content of 2 to 5% is especially preferred.

The electrically conductive paste includes one or more of the above-described glass frits is a total glass frit content within the paste of 5 to 20 wt % and preferably 7–15 wt %. The total content of inorganic solids, including conductor powder and glass frit, is in the range of 55.0 to 85.0 wt %.

At a total glass frit content of less than 5 wt %, a fired terminal electrode film of sufficient density to serve as an effective barrier to the plating solution cannot be achieved, and adhesion to the capacitor assembly is poor. On the other hand, at a glass frit content of more than 20 wt %, glass components rise to the surface of the fired film, greatly compromising plating adhesion.

The glass frit is a finely divided powder having a particle size of about 0.5 to 20 μm, with preferred being 1 to 10 μm. Too large a particle size results in a low density, whereas too small a particle size results in dispersion properties that differ from those of the organic binder, altering the rheology and making it difficult to achieve an ideal coated shape.

At a total content of inorganic solids below 55 wt %, a dense terminal electrode cannot be formed. On the other hand, at a content greater than 85 wt %, the desired paste viscosity is not achieved or the fired film on the terminal electrodes becomes too thick, which tends to result in defects. A total inorganic solids content of 65 to 76 wt % is preferred.

In the practice of the invention, the metal particles are selected from powders of copper, nickel, copper-nickel alloy, and mixtures thereof. The copper powder is preferred. Copper particles that are spherical or of indeterminate shape and have an average particle size of 0.5 to 30 μm, flake-like copper particles having a particle size of 0.1 to 30 μm, and mixtures thereof are preferred. Paste metal particles that are too large compromise the density of the terminal electrode produced therefrom. On the other hand, if the particle size is too small, the dispersion properties differ from those of the organic binder, giving rise to a change in rheology that makes it difficult to achieve an ideal coated shape.

The organic medium used in the electrically conductive paste compositions is one that burns completely at the firing temperature and leaves no incompletely combusted organic material in the fired film. The organic medium is typically added in an amount of 10 to 35 wt %, and preferably 15 to 30 wt %, based on the weight of the paste. A wide variety of inert liquids can be used in the organic medium. The organic medium must be one in which the solids are dispersible with an adequate degree of stability. The Theological properties of the medium must be such that they lend good application properties to the composition. Such properties include dispersion of solids with an adequate degree of stability, good application of composition, appropriate viscosity, thixotropic, appropriate wettability of the substrate and the solids, a good drying rate, good firing properties, and a dried film strength sufficient to withstand rough handling. The organic medium is conventional in the art and is typically a solution of polymer(s) and/or resin(s) in solvent(s). The most frequently used resin for this purpose is ethyl cellulose. Other examples of resins and polymers include ethylhydroxyethyl cellulose, wood rosin, mixtures of ethyl cellulose and phenolic resins, polymethacrylates of lower alcohols, monobutyl ether of ethylene glycol monoacetate, acrylic and styrene polymers can also be used. The most widely used solvents found in thick film compositions are ethyl acetate and terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. Various combinations of these and other solvents are formulated to obtain the viscosity and volatility requirements desired.

In addition, the thick film composition can also include other components that are known in the art of thick film compositions to enhance various properties of the composition, such as adhesion, sintering, processing, brazeability, solderability, reliability, etc., during processing.

In the practice of the invention, the metal particles and the glass frit are dispersed in an organic medium to form a paste, following which the paste is coated onto the terminal electrode-forming sites of the multilayer ceramic capacitor and fired at a temperature of lower than 800° C. to form terminal electrodes. Nickel or solder plating is then applied as a soldering surface to the terminal electrodes after they have been fired, thereby giving finished terminal electrodes.

EXAMPLES

Examples of the invention and comparative examples are given below.

Glass Composition and Test R Suits:

Table 1 below gives the compositions and test results for the glass frits included in the pastes prepared in the examples of the invention and the comparative examples. The glass frits were prepared by melting and quenching, then grinding the glass in a ball mill using alumina balls to an average particle size of 3 to 8 μm.

The measurement methods used are described below.

The coefficient of thermal expansion was determined by computing the slope (ppm/° C.) of the straight-line extension from the value at room temperature to the value at 350° C., as measured with a thermomechanical analyzer manufactured by Rigaku Corporation.

The softening point was determined by a second inflection point (endotherm peak) rom the low-temperature side of the differential thermal curve from room temperature to 900° C., as measured with a Differential Thermal Analyzer manufactured by Rigaku Corporation.

The acid resistance was measured using a fired part having a thickness of about 30 μm and obtained by firing on an alumina substrate. The fired part was immersed in 0.1 N sulfuric acid at 50° C. for 30 minutes, then rinsed with water, after which it was dried at 150° C. for 15 minutes and the percent loss of weight was measured.

TABLE 1

| Glass constituent (wt %) | CE 1 | CE 2 | CE 3 | CE 4 | CE 5 | EX 1 | EX 2 | EX 3 |
|---|---|---|---|---|---|---|---|---|
| $SiO_2$ | 9.5 | 9.7 | 12.5 | 22 | 16.1 | 12.6 | 12.2 | 14.6 |
| $Al_2O_3$ | 13.7 | 11.4 | 2.5 | 3 | 0.5 | 2.4 | 1.7 | 1.2 |
| $B_2O_3$ | 31.5 | 30.2 | 26 | 20 | 24.2 | 23.1 | 23.8 | 22.3 |
| ZnO | 27.2 | 19.6 | 7 | 27 | 4.4 | 4.5 | 4.2 | 3.8 |
| BaO | 5.1 | 13.9 | 37.5 | 22 | 49.6 | 35.0 | 40.1 | 39.3 |
| $Li_2O$ | — | 0.6 | 0.75 | 1 | 0.2 | 0.4 | 0.3 | — |
| MgO | 0.5 | — | 4 | — | 4.2 | 3.7 | 4.6 | 4.8 |
| $Na_2O$ | 8.5 | 8.3 | 3.5 | — | — | 2.3 | 2.1 | 0.8 |
| CaO | 3.9 | 2.8 | — | — | — | — | — | — |
| SrO | 0.1 | — | — | 5 | 0.8 | 13.5 | 7.4 | 12.6 |
| $TiO_2$ | — | 2.6 | 4 | — | — | 1.0 | 2.0 | — |
| $K_2O$ | — | 0.7 | 1.75 | — | — | 0.4 | 0.8 | — |
| $SnO_2$ | — | 0.3 | 0.5 | — | — | 1.2 | 0.6 | 0.5 |
| $B_2O_3 + Na_2O + ZnO$ | 67.2 | 58.1 | 36.5 | 47.0 | 28.6 | 29.9 | 30.1 | 27.0 |
| BaO + SrO | 5.2 | 13.9 | 37.5 | 27.0 | 50.4 | 48.5 | 47.6 | 51.9 |
| Thermal expansion coefficient (ppm) | 8.6 | 9.4 | 10.1 | 7.5 | 7.5 | 10.3 | 10.4 | 9.9 |
| DTA softening point (° C.) | 479 | 496 | 603 | 576 | 462 | 589 | 594 | 595 |
| Weight loss in acid resistance test (%) | −44.0 | −28.6 | −13.6 | −12.9 | −31.2 | −2.7 | −4.5 | −1.0 |
| Paste Composition (wt %) | | | | | | | | |
| Copper | 68 | 68 | 73 | 73 | 72 | 64 | 62 | 61 |
| Glass frit | 4 | 4 | 9 | 7 | 6 | 9 | 9 | 9 |
| Inorganic powders (copper and glass) | 72 | 72 | 82 | 80 | 79 | 73 | 71 | 70 |
| Oganic Medium | 28 | 28 | 18 | 20 | 21 | 27 | 29 | 30 |

Paste Composition:

Each of the terminal electrode paste compositions were prepared comprising the components as listed by weight % in Table 1. All of the copper particle used in these experiments were spherical copper particles having an average particle size of 3 μm. The glasses were prepared from the glass-forming components listed in Table 1 and TEC, DTA melting point and results of acid resistance test were listed in Table 1. The organic medium was a solution of 22 wt % methyl methacrylates (MMA) having weight average molecular weight of 200,000 in 78 wt % butylcarbitolacetate. The respective ingredients were weighed out, stirred, then blended on a three-roll mill to effect an uniform dispersion, yielding a paste. Table 2 shows the paste composition and test results obtained in the examples of the invention and the comparative examples.

Test Results:

Pastes of the above compositions were coated onto the multilayer capacitor chip and fired at 750° C. in a nitrogen atmosphere, giving test specimens. The tests conducted were: degree of blistering, denseness, bonding with nickel internal electrode, rise of glass to surface of terminal electrode, adhesive strength, and acid resistance. In each case, the results were rated on a scale of 1 (worst) to 5 (best). Blistering, denseness and bonding with nickel internal electrode were evaluated by examining a cross section of the fired membrane under a scanning electron microscope. Glass rises to the film surface was rated by examining the surface of the fired film under a metal microscope and a scanning electron microscope. The adhesive strength was evaluated based on peelability when the terminal electrode is cut with a sharp knife. The acid resistance was evaluated by a tape peel test following immersion of the fired part in sulfuric acid. Evaluation results are shown in Table 2.

TABLE 2

| Glass composition (wt %) | CE 1 | CE 2 | CE 3 | CE 4 | CE 5 | EX 1 | EX 2 | EX 3 |
|---|---|---|---|---|---|---|---|---|
| Paste evaluation results (5-point scale) | | | | | | | | |
| Blister | 1 | 2 | 4 | 3 | 4 | 5 | 5 | 5 |
| Denseness | 4 | 4 | 3 | 3 | 2 | 4 | 4 | 5 |
| Bondability with Ni internal electrode | 1 | 2 | 4 | 3 | 3 | 4 | 4 | 5 |
| Glass rise to film surface | 2 | 2 | 4 | 3 | 3 | 4 | 4 | 4 |
| Adhesive strength | 2 | 3 | 4 | 4 | 3 | 4 | 4 | 4 |
| Acid resistance | 1 | 2 | 3 | 3 | 2 | 5 | 4 | 5 |

What is claimed is:

1. An electrically conductive paste comprising at least one conductive powder selected from copper powder, nickel powder, copper-nickel alloy powder, and mixtures thereof; a glass frit which is free of lead, cadmium and bismuth, and which has a softening point of 530 to 650° C., a coefficient of thermal expansion of 9.0 to 11.5 ppm/° C. wherein the powder and glass frit are dispersed in an organic medium, wherein the glass frit is a borosilicate alkaline earth glass containing, based on the weight of the oxides therein, 30 to 60% of BaO+SrO, 20 to 45% of $B_2O_3$+ZnO+$Na_2O$, and 0 to 7% of $Na_2O$.

2. The conductive paste of claim 1 containing 55.0–85 wt % inorganic solids, comprising powder and frit, wherein 5–20 wt % is glass frit.

3. The conductive paste of any one of claims 1 or 2 wherein said organic medium comprises methyl methacrylate and butylcarbitolacetate.

4. A terminal electrode comprising the conductive paste of claims 1 or 2.

5. A method of forming a terminal electrode comprising:
(a) forming the conductive paste of claim 1;
(b) coating the composition of (a) onto a terminal electrode-forming site of a multilayer capacitor; and
(c) firing the multilayer capacitor in (b) to form a finished terminal electrode.

6. A multilayer capacitor utilizing the conductive paste of claim 1.

* * * * *